Oct. 19, 1965    K. NESSELMANN    3,212,273
PROCESS FOR DISCONNECTING AND CONNECTING AT LEAST THREE
HEATING CURRENTS FOR DIFFERENT TEMPERATURES
Filed April 20, 1964
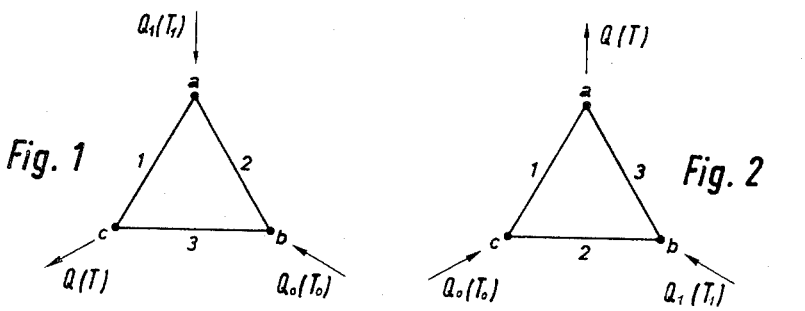
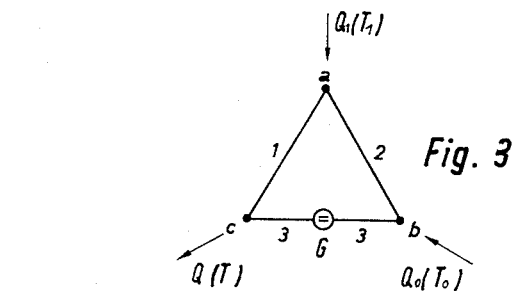
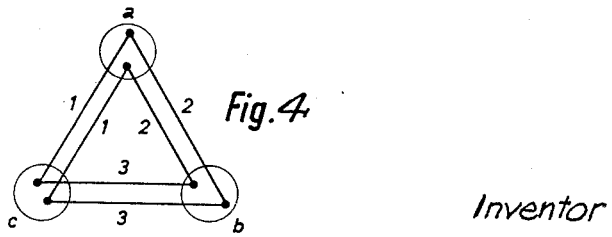
Inventor
KURT NESSELMANN
By Toulmin & Toulmin
Attorneys United States Patent Office 3,212,273
Patented Oct. 19, 1965

3,212,273
PROCESS FOR DISCONNECTING AND CONNECTING AT LEAST THREE HEATING CURRENTS FOR DIFFERENT TEMPERATURES
Kurt Nesselmann, Karlsruhe-Durlach, Germany, assignor to Gesellschaft für Lindes Eismaschinen Aktiengesellschaft, Munich, Germany
Filed Apr. 20, 1964, Ser. No. 360,819
Claims priority, application Germany, Apr. 22, 1963, N 23,075
10 Claims. (Cl. 62—3)

This invention relates to a method and apparatus for effecting heat transfer between fluid bodies and is particularly concerned with such a method and apparatus wherein conventional type heat exchangers and the like are eliminated.

The development of electrical energy by the use of thermal sensitive elements such as thermocouples is known, and is accomplished by subjecting junction places of a thermocouple to respectively different temperatures, whereupon electric current will flow in the thermouple as caused by a voltage created in the thermocouple, and this, of course, represents a flow of energy in the electric system embodying the thermocouple. For example, by supplying heating fluid at a higher temperature to one of the junction places, a smaller volume of fluid at a lower temperature is taken off at the junction place, and according to the first law of thermodynamics, the total change in heat content of the two streams of fluid as measured on opposite sides of the respective thermocouple means, represents the work done by the system, for example, by an electric motor connected to the system. It is also evident that the amount of work done can be controlled by using a plurality of such thermocouples connected in the circuit.

Further, it is known that the process described above can be reversed by supplying electrical energy from a suitable source to the thermocouple. In this case, a stream of fluid at a lower temperature is delivered to one of the junction places of the thermocouple so as to generate current, while, from the second junction place, a stream of heating fluid at a higher temperature is taken off. In this manner one and the same system can be operated either as a refrigerator or as a heat pump.

It is also known in heat exchange systems that cold can be generated by supplying energy to the system as heat energy, such as by an electric heater or by a gas flame. An absorption refrigerator is an example of a system of this type. The system is balanced with the heat energy supplied by the gas flame or electric heater and the heat extracted from the machine by the fluid stream flowing over the junction place being maintained at the intermediate temperature, and the heat picked up by the junction place at the lowest temperature being equal. This process also can be reversed and is done for heating purposes as is known in connection with heat pumps which may be employed for heating building enclosures and the like.

All absorption machines of the nature referred to where heat can be added or withdrawn at any of three different temperatures operate in accordance with the physical laws governing the behavior of binary mixtures, and in all such systems heretofore known, complicated piping systems, expensive heat exchangers and, usually pumps are required to provide for necessary paths for the fluid so that heat can be exchanged therebetween.

With the foregoing in mind, a primary object of the present invention is the provision of a method of effecting energy transfer connection between fluid bodies of different temperature in which the aforementioned complications are eliminated. In particular, the object of this invention is the provision of a method of interconnecting three bodies of fluid at respectively different temperatures for the development of heat or cold in at least one of the said bodies.

In general, the present invention is accomplished by a system of thermal elements, namely, thermocouples having junction regions associated with the respective bodies of fluid for receiving energy therefrom and for delivering energy thereto.

In one form of the invention an electrical system having in circuit three thermal elements, namely thermocouples, is provided with each junction region corresponding to one of the three temperature stages of an absorption heating system. In this case no electrical energy is required to be added or extracted from the system.

It is also contemplated with such a system to provide means for extracting or adding electrical energy to the electric circuit containing the thermocouple means, thereby to influence the created temperature at at least one of the junction places of the thermocouple means.

These and other objects and advances of this invention will become more apparent upon reference to the following specification taken in connection with the accompanying drawings, in which:

FIGURE 1 is a diagrammatic representation of a thermocouple system for exchanging energy between three flowing streams of different temperatures. Heat energy enters the system at (a) and (b) with removal at (c);

FIGURE 2 is a variation of FIGURE 1 with heat being absorbed at (b) and (c) and removed at (a);

FIGURE 3 is a variation of FIGURE 1 which includes electric generating means; and FIGURE 4 is a variation of FIGURE 1, showing a plurality of thermocouple systems superimposed in the three flowing streams.

In FIGURE 1 there is shown a system of three thermal elements with thermocouple junction places at $a$, $b$ and $c$. Preferably, three different thermocouple materials indicated at 1, 2 and 3 are employed which would develop predetermined voltages at the junction places. Junction place $a$ is at a temperature $T_1$, which is maintained by a supply of fluid represented at $Q_1$. At contact $c$, fluid Q is taken off at the temperature T. This fluid flow might, for example, represent cooling water. If $T_1$ is greater than T there will then be a production of cold at junction place $b$ so that the temperature $T_0$ is less than T, and a heat flow will be developed that can be employed for the production of cold.

As in an absorption refrigerator, cold at a low temperature $T_0$ is produced by delivery to the system of a current of fluid $Q_1$, which is at a higher temperature $T_1$, and in accordance with the first and second laws of thermodynamics, a fluid current at an intermediate temperature T will be taken off. It will be seen from the foregoing that the three bodies of fluid, represented by the streams Q, $Q_1$ and $Q_0$ are, in effect, in heat exchange relation with the effective result being the production of a reduced temperature at junction place $b$.

It is possible, as in the case of an absorption refrigerator system, to reverse the process. For example, a current of fluid at the intermediate temperature T could be delivered to the machine and could be taken off at a lower temperature $T_0$ so as to develop heat at a higher temperature $T_1$ for heating purposes.

In the system according to FIGURE 1, it is possible also to supply the higher temperature at junction place $b$. If, then, the junction place $c$ is kept at an intermediate temperature T by a suitable supply of heating exchange fluid, such as cooling water, a predetermined low temperature $T_0$ will occur at junction place $a$. In this case also the direction of flow of heat in the system is reversed over that originally described.

With reference now to FIGURE 2, the sequence of the materials has been modified, and in this figure $T_1$ is greater than T which, in turn, is greater than $T_0$. The delivery and removal of heating currents to and from the system is indicated by the arrows. This system, with respect to the addition or extraction of heat at any particular junction place can also be reversed. If the high temperature $T_1$ is applied to junction place c while junction place a is held at some intermediate temperature T, then junction place b will be reduced to a lower temperature $T_0$ which will generate cold in the fluid stream pertaining thereto.

It is still further possible, in a system of the nature disclosed, in which three thermocouple elements are employed, and with each thermocouple element being in heat exchange relation with a fluid current, to include in the electrical system a generator or a motor or some other device supplying or absorbing electrical energy. This is shown in FIGURE 3, where G represents a generator or motor. By the arrangement of FIGURE 3, the difference over the arrangement of FIGURES 1 and 2 is created that a change could be effected in one of the temperatures at at least one of the junction places beyond what could be accomplished with the fluid streams at any given temperature.

It is also possible, for example, in the arrangement of FIGURE 1, by changing one temperature, for example temperature $T_1$, while temperature T is held constant to regulate the temperature $T_0$.

Still further, as shown in FIGURE 4, the junction places at points a, b and c could consist of two or more junction places arranged in series in the manner shown. This system also could have included therein a generator or motor or the like in accordance with the teachings of FIGURE 6.

Known thermoelectric conductor materials for the construction of the thermocouples could be employed, for example, copper-constantan; iron-constantan; platinum-platinum-rhodium; chromel-alumel. Other materials known in the art can also be employed for developing the necessary voltages to produce the currents required to effect the transfer of energy in the system by means of which temperature control of at least one of the fluid streams is accomplished.

It will be understood that this invention is susceptible to modification in order to adapt it to different usages and conditions; and accordingly, it is desired to comprehend such modifications within this invention as may fall within the scope of the appended claims.

I claim:

1. The method of effecting a change in the heat energy of a first fluid body, a second fluid body and a third fluid body, each of said fluid bodies having a different temperature comprising; placing in said first fluid body a first thermocouple junction, said first thermocouple junction comprising the union of a first thermoelectric conductor and a second thermoelectric conductor of dissimilar material; placing in said second fluid body a second thermocouple junction, said second thermocouple junction comprising the union of said second thermoelectric conductor and a third thermoelectric conductor of dissimilar material from said first and second thermoelectric conductors; placing in said third fluid body a third thermocouple junction, said third thermocouple junction comprising the union of said third and first thermoelectric conductors; connecting said first thermocouple junction and said second thermocouple junction; connecting said second thermocouple junction and said third thermocouple junction; and connecting said third thermocouple junction and said first thermocouple junction.

2. The method according to claim 1 in which said junctions are connected in circuit with a component operable for changing the flow of electrical energy in the circuit.

3. The method according to claim 2 in which said component is a motor and extracts electrical energy from the circuit.

4. The method according to claim 2 in which said component is a generator and supplies electrical energy to the circuit.

5. A system for exchanging energy between three flowing fluid streams comprising; three thermocouple junction means, each of said junction means comprising two dissimilar materials; at least one of said thermocouple junction means in heat exchange relation with each stream, and circuit means interconnecting said thermocouple junction means.

6. A system for exchanging energy between three flowing fluid streams comprising; three thermocouple junction means, each of said junction means comprising two dissimilar materials; at least one of said thermocouple junction means in heat exchange relation with each stream, and circuit means interconnecting said thermocouple junction means, said circuit means including a motor to extract electrical energy from the circuit.

7. A system for exchanging energy between three flowing fluid streams comprising; three thermocouple junction means, each of said junction means comprising two dissimilar materials; at least one of said thermocouple junction means in heat exchange relation with each stream, and circuit means interconnecting said thermocouple junction means, said circuit means including a generator to supply electrical energy to the circuit.

8. A system for exchanging energy between three flowing fluid streams comprising; three thermocouple junction means, each of said junction means comprising two dissimilar materials; at least one of said thermocouple junction means in heat exchange relation with each stream, circuit means interconnecting said thermocouple junction means, at least one of said streams supplying heat energy to its respective junction means and at least one other stream extracting heat energy from its respective junction means.

9. A system for exchanging energy between three flowing fluid streams comprising a circuit, said circuit comprising three thermoelectric conductors of dissimilar materials, said conductors united to form three thermocouple junctions, each of said thermocouple junctions inserted in one of said fluid streams.

10. A system for exchanging energy between three flowing fluid streams comprising a plurality of circuits, each of said circuits comprising three thermoelectric conductors of dissimilar materials, said conductors united to form three thermocouple junctions, each of said thermocouple junctions inserted in one of said fluid streams.

References Cited by the Examiner

UNITED STATES PATENTS

| | | | |
|---|---|---|---|
| 389,125 | 9/88 | Weston | 62—3 |
| 1,818,437 | 8/31 | Stuart | 62—3 |
| 2,881,594 | 4/59 | Hopkins | 62—3 |

WILLIAM J. WYE, *Primary Examiner.*